Nov. 1, 1927.
E. R. WOLCOTT
1,647,446
PROCESS FOR COLLECTING AND UTILIZING ALUMINUM CHLORIDE
Filed Sept. 7, 1920
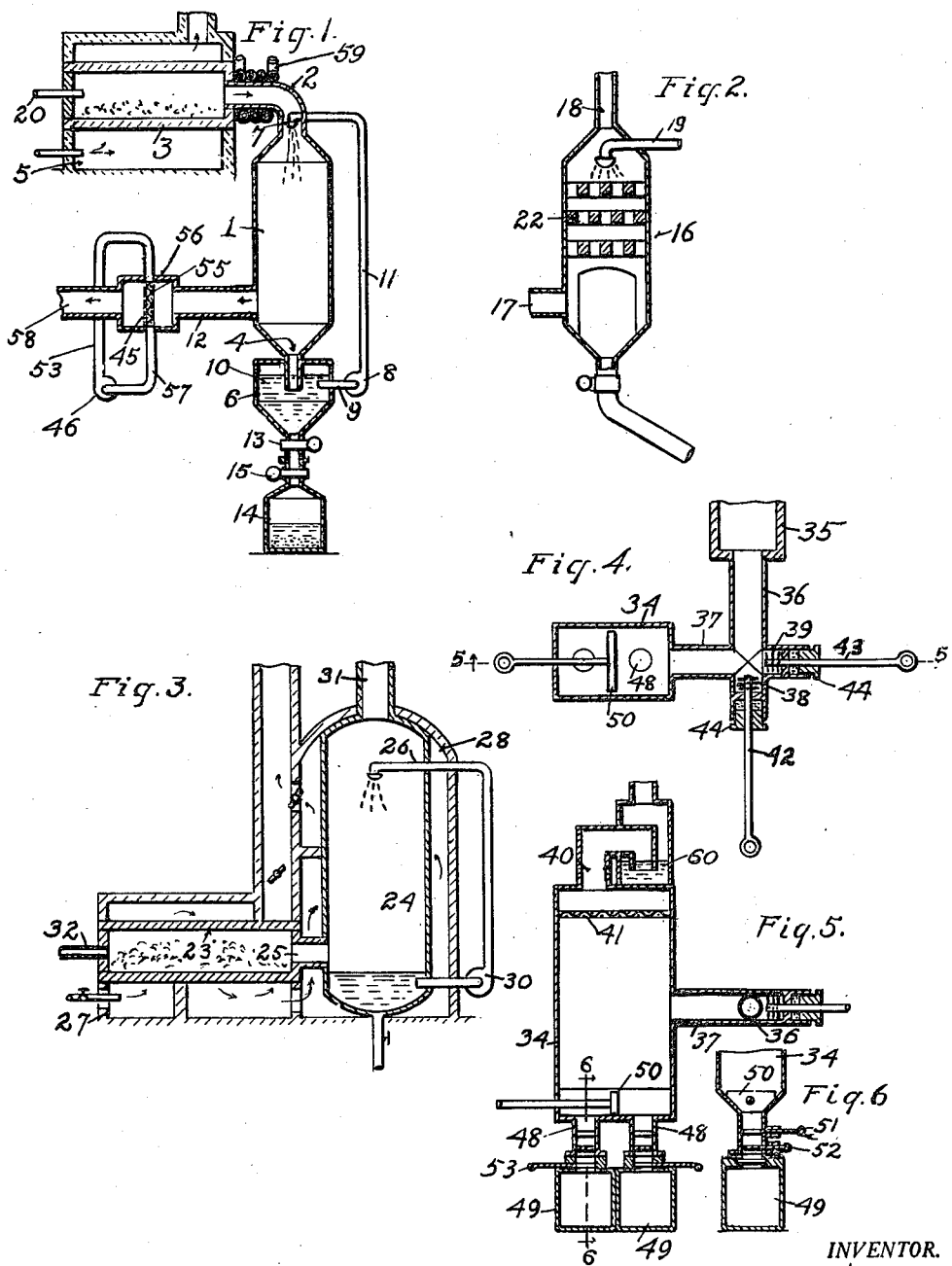
INVENTOR.
Edson R. Wolcott
BY Arthur P. Knight
ATTORNEY Patented Nov. 1, 1927.

1,647,446

UNITED STATES PATENT OFFICE.

EDSON R. WOLCOTT, OF LOS ANGELES, CALIFORNIA, ASSIGNOR, BY MESNE ASSIGNMENTS, TO THE TEXAS COMPANY, OF NEW YORK, N. Y., A CORPORATION OF DELAWARE.

PROCESS FOR COLLECTING AND UTILIZING ALUMINUM CHLORIDE.

Application filed September 7, 1920. Serial No. 408,695.

This invention relates to the manufacture and utilization of aluminum chloride, particularly as an agent for use in petroleum refining. When used for this purpose, it is essential that the aluminum chloride should be substantially anhydrous and free from basic salt and it is, therefore, essential that the aluminum chloride should be protected from moisture in any form, since in the presence of moisture anhydrous aluminum chloride rapidly decomposes, forming hydrochloric acid and a hydrated salt or basic salt, which is ineffective as a catalytic agent for the purpose stated.

The main object of my invention is to provide for protection of the aluminum chloride from contact with moisture, for example, the moisture contained in atmospheric air, from the time at which it leaves the retort or apparatus in which it is produced to the time at which it is utilized as a catalytic agent.

The accompanying drawings illustrate, diagrammatically, apparatus suitable for carrying out my invention, and referring thereto:

Fig. 1 is a vertical section of one form of such an apparatus;

Fig. 2 is a vertical section of another form thereof;

Fig. 3 is a vertical section of another form of apparatus adapted for passing the aluminum chloride in vapor or fume form directly into contact with the petroleum to be treated in the refining operation;

Fig. 4 is a horizontal section showing another form of such apparatus;

Fig. 5 is a section on line 5—5 in Fig. 4;

Fig. 6 is a section on line 6—6 in Fig. 5.

The apparatus shown in Fig. 1 comprises a chamber or casing 1, having an inlet pipe or connection 2 communicating with the outlet of a retort 3 in which aluminum chloride is produced and evolved, said chamber 1 having at its bottom an outlet 4 discharging into a collecting tank 6. Means are provided for spraying into chamber 1 a liquid capable of acting as a protective medium for the aluminum chloride, such liquid being, for example, alcohol, carbon-disulphide, carbontetrachloride, ethylene-chloride, or equivalent liquid, which is capable either of dissolving aluminum chloride or of covering and submerging the same, so as in either case to substantially prevent access of atmospheric air to the aluminum chloride dissolved or contained therein. For the purpose of bringing the aluminum chloride into effective contact with this liquid and also for the prupose of enabling the liquid to act as a collecting agent for the aluminum chloride, I prefer to spray the liquid into the chamber 1, for example, by means of a spray nozzle 7 to which the liquid is forced by a pump 8, having an intake pipe 9 extending into the body of liquid 10 into the collecting chamber 6 and having an outlet pipe 11 leading to spray nozzle 7. Chamber 1 is also provided with an outlet pipe 12 for residual gas, which may have a sealing means 45 for preventing entrance of atmospheric air to the chamber 1. Said sealing means may consist of a film of liquid (such as sulphuric acid, or of oil, for example, petroleum) supplied by pump 46 through pipe 53 to the upper end of a screen 55 in a chamber 56, such liquid running down on the screen to an outlet pipe 57, which returns it to pump 46. The gases passing from chamber 1 have sufficient power to break through this film of liquid, but said film prevents diffusion of air back to the chamber. The outlet 58 of chamber 56 may be connected to any suitable means for utilizing residual gas. A cooling pipe 59 may be provided for reducing the temperature of the fume before it enters the spray chamber 1, so as to avoid overheating of the liquid, which might result in chemical or catalytic action.

The operation of my process as carried out in the apparatus above described is as follows:

Aluminum chloride is generated or produced in retort or apparatus 3 in any usual or suitable manner and the vapor of aluminum chloride, together with any other gases or vapor constituents that may be present, passes through the pipe 2 to the chamber 1 and is therein subjected to contact with the descending stream or spray from nozzle 7, the aluminum chloride being in the form of fume and being, by the action of the liquid, washed out of the body of gas containing the same, and collected in the chamber 6, together with the liquid descending into said chamber. The liquid referred to may be circulated continuously or intermittently, as desired, by pump 8 and portions of the liquid may be withdrawn from chamber 6 continuously or intermittently, as may be desired, through a valve 13 into suitable receptacle or container 14. Said container or receptacle may be provided with a closure means 15 whereby it may be sealed for transportation or storage until it is eventually delivered into the petroleum refining apparatus. If desired, however, the liquid containing the aluminum chloride may be piped directly to the point of utilization, for example, to a petroleum refining retort. In either case, the anhydrous aluminum chloride is maintained in anhydrous condition until it is introduced into the refining apparatus.

Instead of spraying the protective liquid into a body of gas containing the aluminum chloride, such body of gas may be passed through a contact absorption tower or chamber, such as indicated at 16 in Fig. 2, the gas containing the aluminum chloride entering at an inlet 17 and passing through checkerwork, or equivalent means 22, and passing out at an outlet 18, and the protective liquid being sprayed onto the checkerwork 22 from a supply pipe 19 connected to any suitable source of the protective liquid. As indicated in this figure, the outlet for the liquid containing the aluminum chloride may be provided with a pipe 21 leading to the point where it is to be utilized.

While the aluminum chloride may be produced in any suitable manner, I prefer to produce it by subjecting aluminum silicate material, such as clay or shale, to the action of chlorine and heat in the presence of carbon, and, for this purpose, the retort 3, indicated in Fig. 1, may be heated by means of a furnace 5 and may be provided with a supply pipe 20 for chlorine. The charge of clay, or other aluminum silicate material, and of carbon produced, for example, by a preliminary distillation of carboniferous material contained in or mixed with the clay, is assumed to be substantially free from moisture by reason of the preliminary heating and distillation, so that the product of reaction with the chlorine entering through pipe 3 is substantially anhydrous aluminum chloride, which passes through the outlet 2 in the form of fume and is collected by spray issuing from nozzle 7. The residual gas in the stated case consists merely of carbon monoxide, with some chlorine, and may be conducted to any suitable means for utilizing the same. Aluminum chloride prepared in this manner generally contains more or less ferric chloride from iron compound present in the clay or shale used, and by introducing the product in the manner stated into a suitable liquid, for example, either methyl or ethyl alcohol, I effect a separation of the ferric chloride from the aluminum chloride, ferric chloride being more readily soluble in such liquid, and passing into solution, whereas aluminum chloride is less soluble and remains largely undissolved, and may be separated by decantation or by filtration. Absolute grain alcohol is not required, as any small amount of water present will only result in production of a corresponding amount of aluminum hydrate.

The liquid brought into contact with the anhydrous aluminum chloride may be capable of reaction therewith, and, in such case, the apparatus may be of a type, such as shown in Fig. 3, adapted to pass the aluminum chloride vapor or fume directly from the retort or producer 23 through outlet 25 to a retort or reaction chamber 24 provided with an outlet 31, with means 26 for spraying the reacting liquid thereinto, and with means for maintaining said retort 24 at proper temperature for reaction. For this purpose the waste gases from the furnace 27, which serves to heat the aluminum chloride producer or retort 23 may be passed through a casing 28 around the retort or reaction chamber 24. The liquid may be circulated by pump 30, so as to be continuously sprayed through the body of gas and vapor ascending in the chamber 24, thereby washing out the aluminum chloride free from such body of gas or vapor and at the same time giving maximum contact for reaction between the aluminum chloride and the said liquid. The liquid in this case may consist of petroleum or petroleum product from which it is desired to produce a more volatile product of greater value, and, in such case, the gases or vapors passing through outlet 31 of chamber 24 will contain such relatively volatile product, which is condensed and collected in any suitable manner. Retort 23 may be supplied with chlorine from a pipe 32 and the aluminum chloride may be produced in said retort in the manner above described, the resulting fume of aluminum chloride passing into chamber 24. The liquid sprayed into the fume in chamber 24 acts as a collecting agent for the aluminum chloride causing the latter to be taken up by and contained in the body of liquid and eventually to react with the liquid, for example, in effecting a petroleum refining operation, petroleum is used as the collecting liquid.

In case it is desired to maintain the aluminum chloride in anhydrous condition without recourse to a protective liquid, the means shown in Figs. 4 to 6 may be used, said means comprising a casing or chamber 34 connected to the retort 35 for producing or generating aluminum chloride, by pipe means 36 and 37, said pipe means being provided with cleaning brushes or devices 38 and 39 (consisting, for example, of brushes having operating handles 42 and 43 working through stuffing boxes 44) for brushing or scraping any aluminum chloride which may be deposited on the walls of such piping and forcing it eventually into the collection chamber 34. Said collecting chamber is provided with an outlet 40 for the residual gases and with a filter or screen 41 between the inlet pipe 37 and the outlet 40 of the said chamber 34, said screen being preferably above the point of communication of said inlet pipe 37 with the chamber 34, so that the gases ascend in passing from the said inlet pipe to the outlet 40. Under these conditions, I have found that by making the collecting chamber 34 of sufficient dimensions, so as to provide for a very slow upward movement, that the major portion of the aluminum chloride fume may be caused to settle to the lower part of the chamber 34, so that little, if any, deposit is formed in the filter 41, which, however, acts as a safe-guard against any loss of aluminum chloride fume. The material collected in the lower part of the collecting chamber 34 may be removed through outlet openings 48 into receptacles 49 and, if necessary, scraping means 50 may be provided for scraping the bottom of the chamber 34 to cause the collected material to fall through the outlet openings 48. I prefer to provide double gates or valves 51 and 52 for the outlets 48 of the chamber 34, these gates being alternately operated to permit of the discharge of collected material without admitting air to the chamber 34. Each receptacle 49 may be provided with a closure means 53 whereby it may be tightly closed after charging. The outlet 40 of chamber 34 may have a liquid seal 60 containing suitable liquid, such as sulfuric acid, or any suitable oil, for preventing diffusion of atmospheric air into said chamber.

When the liquid is applied to the aluminum chloride for the purpose of protecting the same from access of moisture, it is desirable to use a liquid which is non-hygroscopic, so that it will not absorb moisture from the atmosphere.

What I claim is:

1. The process of preparing and maintaining anhydrous aluminum chloride in anhydrous condition, which consists in bringing the anhydrous aluminum chloride into a body of protective liquid under such conditions of temperature as to avoid catalytic decomposition whereby the aluminum chloride is substantially protected from contact with atmospheric air.

2. The process of preparing and maintaining anhydrous aluminum chloride in anhydrous condition, which consists in introducing aluminum chloride vapors into a body of protective liquid which is inert with respect to the aluminum chloride and is non-hygroscopic, so as to cover and protect the aluminum chloride from contact with atmospheric air.

3. The process which consists in producing a fume of aluminum chloride and spraying a non-hygroscopic liquid into said fume to collect the fume in such liquid.

4. The process of preparing and maintaining anhydrous aluminum chloride in anhydrous condition, which consists in bringing the anhydrous aluminum chloride in vaporous form into a body of protective liquid whereby the aluminum chloride is substantially protected from contact with atmospheric air.

5. The process which comprises producing anhydrous aluminum chloride in the vaporous state, and spraying said product with a protective liquid to prevent its exposure to atmospheric moisture and to thus maintain the aluminum chloride in anhydrous condition.

6. The process which comprises producing aluminum chloride in the vaporous state, collecting the product still in anhydrous condition by spraying it with a non-hygroscopic protective liquid whereby it is kept free from contact with atmospheric moisture.

7. The process which consists in producing anhydrous aluminum chloride in the vaporous state in a heated chamber, delivering said product while still in heated and vaporous condition into a contact chamber where it is intimately contacted with a protective liquid, delivering the resulting product into a receiver and preventing the acess of atmospheric moisture into all parts of the apparatus during the process whereby the aluminum chloride ultimately collected in the receiver is in anhydrous condition.

8. The process which consists in generating vapors comprising aluminum chloride and contacting said vapors with a non-aqueous solvent of the aluminum chloride.

9. The process which consists in generating vapors comprising aluminum chloride and washing said vapors with iron chloride a non-aqueous fluid having a greater solvent affinity for the ferric chloride than for the aluminum chloride.

10. The process which consists in generating vapors comprising aluminum chloride and iron chloride and washing said vapors with alcohol.

11. The process which consists in generating vapors comprising aluminum chloride and iron chloride, washing said vapors with alcohol and separating the resultant solution containing iron chloride from that containing the aluminum chloride.

12. The process that consists in generating vapors comprising aluminum chloride and contacting said vapors with a non-aqueous liquid so as to absorb the aluminum chloride therein.

In testimony whereof I have hereunto subscribed my name this 26th day of August, 1920.

EDSON R. WOLCOTT.